Patented Apr. 13, 1948

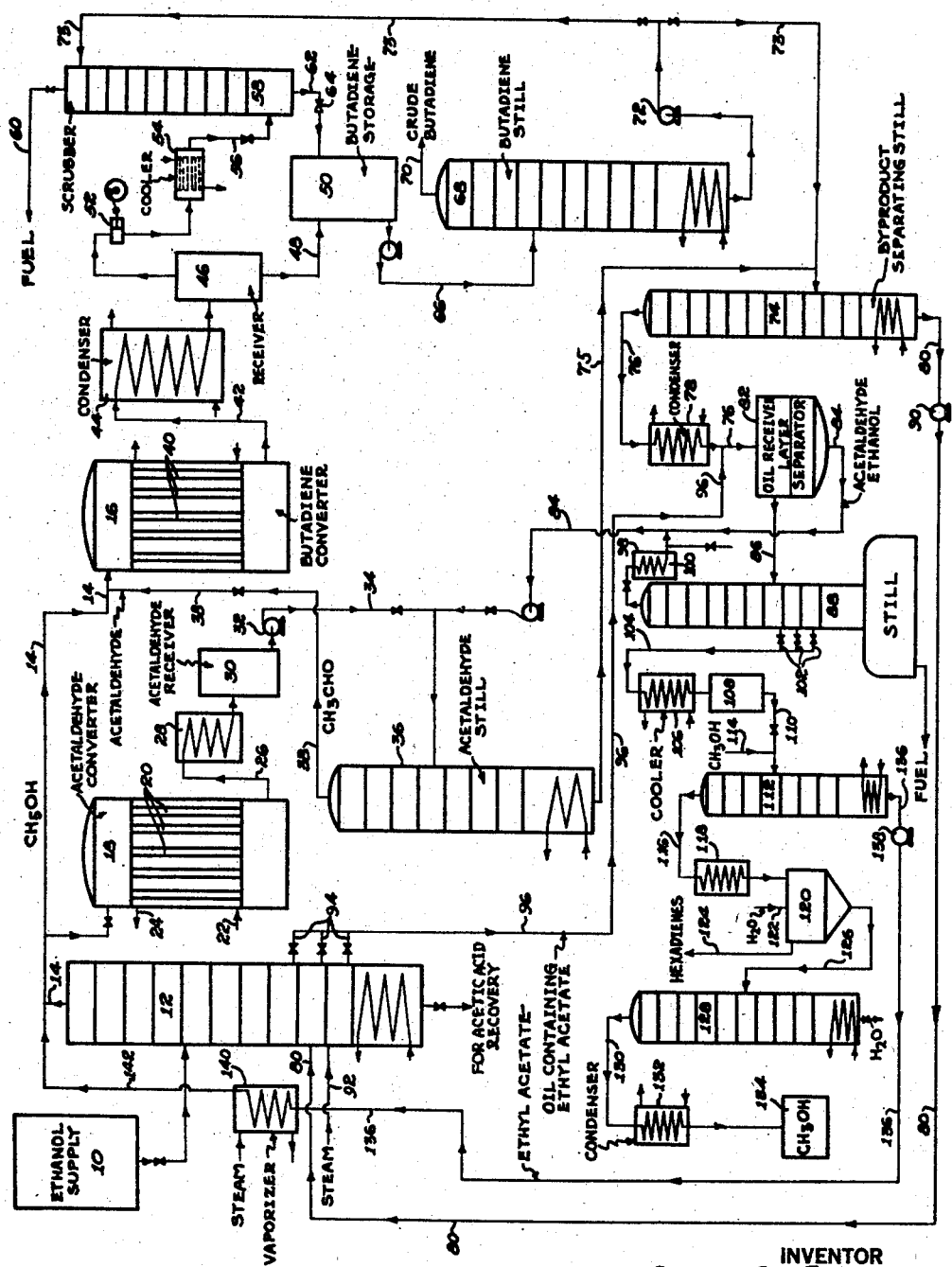

2,439,587

UNITED STATES PATENT OFFICE 2,439,587

MANUFACTURE OF DIENES

Eldon E. Stahly, Pittsburgh, Pa., assignor to Koppers Company, Inc., Pittsburgh, Pa., a corporation of Delaware Application May 17, 1945, Serial No. 594,213

9 Claims. (Cl. 260—681)

This invention relates to the manufacture of dienes. More particularly the invention relates to the manufacture of butadiene from ethyl acetate and acetaldehyde.

Butadiene is now being manufactured on a large scale from ethyl alcohol. The ethyl alcohol is dehydrogenated with a dehydrogenation catalyst to produce acetaldehyde. Another portion of ethyl alcohol is vaporized and mixed with acetaldehyde vapor and the mixture is then passed into contact with a dehydration catalyst to form butadiene and water. In the acetaldehyde-ethyl alcohol conversion some ethyl ether is formed and this ether or a large part thereof is recovered with the acetaldehyde which is passed into the butadiene converter. There are also small amounts of ethyl esters in the alcohol vapors passing into the butadiene converter. It is believed that crotonaldehyde is formed as an intermediate product in the production of butadiene. Many other by-products are formed along with the butadiene.

Among the products flowing from the butadiene converter are butadiene, water, unconverted ethanol, acetaldehyde, ethyl ether, ethyl acetate, $C_1$ to $C_3$ hydrocarbons and a mixture of materials called oils. The butadiene conversion products are carefully refined to separate the butadiene and to recover the ethyl alcohol and acetaldehyde. The remaining by-products have been heretofore burned as fuel.

By careful analysis of the by-products it has been found that with a butadiene conversion efficiency between sixty and sixty-five percent, about 5.6 percent of the acetaldehyde is converted to ethyl acetate. If this ethyl acetate is recovered and continuously recycled a reaction equilibrium concentration of seven weight percent ethyl acetate is reached. It is important, therefore, that this ethyl acetate should be recovered.

I have now discovered that the ethyl acetate will react with acetaldehyde in the presence of water and a dehydration catalyst to produce butadiene. Moreover, I have found that ethyl acetate may be substituted mol for mol for ethanol in the butadiene conversion or the ethyl acetate may form part of the charge of ethanol and acetaldehyde in the usual butadiene conversion process. When ethyl acetate is substituted for part or all of the ethanol the same conversion efficiency to butadiene obtains, i. e. sixty to sixty-five percent based on ethanol equivalents in the feed. At the same time acetic acid is produced which may be recovered.

The primary object of the present invention is to provide a process of producing dienes from ethyl acetate and acetaldehyde.

Another object of the invention is to provide a process by which ethyl acetate may be used in mixture with ethanol and acetaldehyde to produce butadiene.

A further object of the invention is to provide a process by which the ethyl acetate formed in the catalytic dehydration reaction of the ethanol and acetaldehyde may be used in the reaction to produce an additional amount of butadiene.

With these and other objects in view the invention consists in the improved process of making butadiene hereinafter described and particulaly defined in the appended claims.

The various features of the invention are illustrated in the accompanying drawing which is a diagrammatic flow sheet of the apparatus and various steps in the process for producing butadiene from ethanol, ethyl acetate and acetaldehyde.

To practise the invention with the apparatus illustrated in the drawing, ethanol is drawn from a storage tank 10 and flows to a fractionation still 12. In the still 12 the ethanol supplied is vaporized and at the same time ethanol which is recovered from the reaction is distilled and purified. Ethanol vapors leave the top of the still 12 and flow through a line 14 to a butadiene converter 16. Part of the ethanol vapors passing through the line 14 enter the top of an acetaldehyde converter 18. The converter 18 is filled with a dehydrogenation catalyst for the purpose of dehydrogenating ethanol to produce acetaldehyde. The catalyst is mounted in a series of tubes 20 in the converter and consists of a mixture of chromium oxide ($Cr_2O_3$), and copper oxide (CuO) deposited upon a carrier. This catalyst and the process of making the catalyst are described in the patent to Young 1,977,750 granted Oct. 23, 1934. The dehydrogenation reaction is controlled by means of heated Dowtherm which is introduced through a line 22 and flows out of the converter through a line 24. The Dowtherm maintains a temperature throughout the converter of approximately 200° to 300° C. The acetaldehyde conversion products leave the bottom of the converter 18 through a line 26 and pass through a condenser 28. The condensate collects in a receiver 30 and is drawn out through a pump 32 and passed through a pipe 34 to an acetaldehyde fractionating still 36. In the still 36 acetaldehyde vapors are formed which leave the top of the still through a line 38 and are introduced into the line 14 for mixture with the ethanol entering the butadiene converter. Preferably the molar ratio of ethanol to acetaldehyde is from two and a half mols to three mols of ethanol for one mol of acetaldehyde.

The mixture of ethanol and acetaldehyde vapors pass through a dehydrogenation-dehydration catalyst which is mounted in tubes 40 in the converter 16. This catalyst is preferably composed of a silica gel which is promoted with an oxide of tantalum, zirconium or columbium. A preferred catalyst is composed of $Ta_2O_5$-$SiO_2$. The composition and method of making this catalyst is described in the patent of Toussaint & Dunn No. 2,421,361 granted May 27, 1947. A temperature of from 250° to 400° C. is maintained across the catalyst bed in the converter 16, this temperature being controlled by Dowtherm which is circulated through the converter. The butadiene conversion products leave the converter 16 through a line 42 and pass through a condenser 44 into a receiver 46. Butadiene conversion products flow from the receiver 46 through line 48 into a butadiene storage tank 50. Uncondensed butadiene and by-product vapors entering the receiver 46 are withdrawn by a compressor 52 and forced under pressure through a cooler 54. The cooled products flow through a line 56 into the bottom of a scrubber 58 where they are scrubbed by a solution composed principally of ethanol, acetaldehyde and water which is recovered from the butadiene refining still as hereinafter described. The unabsorbed gaseous products pass out of the top of the scrubber, flow through a line 60 and may be burned as fuel. The scrubbing liquid containing butadiene passes through a line 62 and pressure reducing valve 64 into the receiver 50. The crude butadiene products from the storage tank 50 are pumped through a line 66 into the mid portion of a butadiene still 68. In the still 68 a highly concentrated butadiene product goes overhead through a line 70 to a butadiene refining apparatus for further purification. The products of the butadiene reaction are removed from the bottom of the butadiene still and are composed principally of ethanol and acetaldehyde with a substantial amount of water, piperylene, ether and miscellaneous oils. A portion of this product is forced by a pump 72 through a line 73 into the top of the scrubber 58 for absorbing vapors from the butadiene converter. The main part of the by-products flow through the line 73 into the mid portion of a by-product still 74. The bottoms from the acetaldehyde still 36 flow through a line 75 and are mixed with the product flowing through the line 73 into the byproduct still 74. The still bottoms are made up principally of ethyl alcohol, water, ethyl acetate and hexadienes. In this still ether, acetaldehyde and oil products are taken overhead through a line 76 into a condenser 78 and pass into a separator 82. From the separator 82 acetaldehyde and ethanol are drawn through a bottom outlet line 84 and are pumped through the line into the mid portion of the acetaldyhde still 36 for further refining. The oil layer from the separator 82 passes through a line 86 into a still 88. The residue of the by-product still 74 is composed largely of ethanol and has some oil products therein. This residue is withdrawn from the still 74 through a line 80 and forced by means of a pump 90 into the midportion of the alcohol still 12.

A heating coil is provided at the bottom of the alcohol still 12 to carry on the distillation and in addition to this heat live steam is introduced through a line 92 for the purpose of separating alcohol vapor from the still residue. Organic oil by-products accumulate on the bottom trays of the still 12 and these products are withdrawn through lines 94 and pass through a line 96 into the line 76 flowing from the condenser 78 to the oil receiver 82. This oily layer is added to the oily layer separated in the still 74 and the accumulated oil layers flow from the separator 82 through the line 86 into the still 88.

In the still 88, ether and acetaldehyde are driven overhead through a line 98 into a condenser 100 and then flow from the condenser through the line 84 by which they may be taken up by a pump and forced into the acetaldehyde still 36. Oily material which contains ethyl esters accumulates on the bottom trays of the still and these esters are withdrawn through lines 102 into line 104 and condensed in a condenser 106. This condensate is accumulated in a receiver 108 and periodically may be withdrawn through a line 110 into the mid portion of a still 112. The oily material passing into the still 112 contains principally ethyl acetate and hexadienes. Methyl alcohol is introduced into the feed line 110 through a line 114 and this alcohol forms an azeotropic mixture with the hexadienes. In the distillation the hexadiene-methyl alcohol azeotrope is distilled overhead through a line 116 and passes through a condenser 118 into a receiver or separator 120. The azeotropic mixture is then diluted with water introduced through a line 122 whereupon the hexadienes separate from the alcohol-water mixture and the hexadienes may be withdrawn through a line 124 and the alcohol-water mixture is withdrawn from the separator through a line 126 and introduced into the mid portion of an alcohol concentrating still 128. In the still 128 dry methanol passes overhead through a line 130 into condenser 132 and is collected in a receiver 134. The residue of the still 112 is composed principally of ethyl acetate. This ethyl acetate is withdrawn from the base of the still 112 through a line 136 and is forced by means of a pump 138 through a steam vaporizer 140. The ethyl acetate is vaporized in the heater 140 and flows through a line 142 into the alcohol vapor line 14. This ethyl acetate in vapor form is thereby mixed with the ethanol vapors generated in the still 12 and acts to make up the charge for the butadiene converter 16.

The operation of the process has shown that the ethyl acetate recovered from the conversion products of the butadiene conversion constitutes about seven percent by weight of the total charge of vapors passing through the line 14 into the butadiene converter 16 when the ethyl acetate is continuously recovered and recycled. When operating the butadiene converter at a temperature of 350° C., in the catalyst bed and with a combined charge of ethanol and ethyl acetate in the ratio of two and a half to three mols of the mixture to one mol of acetaldehyde, an equilibrium reaction is established whereby the ethyl acetate formed in the butadiene converter is about seven percent by weight of the combined charge of materials passing into the butadiene converter 16. In the reaction it appears that the ethyl acetate in the presence of water reacts with the acetaldehyde to form butadiene. One mol of ethyl acetate directly replaces one mol of ethanol in the butadiene reaction, and simultaneously one mol of acetic acid is set free for each mol of ethyl acetate which enters the reaction. This acetic acid may be recovered with the by-products from the butadiene still. In the combined ethanol-ethyl acetate charge to the butadiene converter the ethyl acetate constitutes about seven percent by weight, the ethanol about sixty-three percent by weight, the acetaldehyde about twenty-three percent by weight and water about seven percent.

As a typical example of the operation of the apparatus when using ethanol and ethyl acetate, in the charge, it has been found that with a feed rate of 0.4 volume of feed per volume of catalyst per hour, with a reaction temperature in the catalyst bed of 353° C. and charging 6.9 percent water, 6.8 percent ethyl acetate, 63.3 percent ethanol and 23.0 percent acetaldehyde, an ultimate efficiency of reaction of seventy-four percent was obtained which showed an efficiency of sixty-seven percent conversion of the alcohol and eighty-eight percent conversion of the acetaldehyde. The product contained 6.8% ethyl acetate.

In the typical example given above, when the reaction reaches equilibrium conditions, approximately seven percent of ethyl acetate is present in the reaction. On the other hand, if the same operating conditions are used and four percent by weight of ethyl acetate is included in the charge, then the percentage of ethyl acetate in the reaction product will be approximately five percent by weight. Further when maintaining the same operating conditions as outlined in the above typical example, if ten percent by weight of ethyl acetate is included in the feed, then approximately nine percent by weight of ethyl acetate will be found in the product. These tests thus show that approximately seven percent of ethyl acetate by weight of the charge is an equilibrium concentration for the ordinary operating conditions.

If instead of using ethyl alcohol as the main charge product, ethyl acetate is used as the main charge product and carrying on the butadiene reaction in the temperature range of 325° to 350° C. in the presence of seven to eight percent by weight of water, then ten to fifteen percent by weight of ethyl alcohol is present in the products produced when the reaction is carried on at equilibrium concentrations. Therefore if ethyl acetate is used as the main charge product it would be desirable to refine the products made to recover the ethanol and add it to the charge along with ethyl acetate.

As a typical example of the operation of the process using only ethyl acetate and acetaldehyde in the feed, it was found that with a feed rate of 0.56 volume of feed per volume of catalyst per hour with a reaction temperature in the catalyst bed of 326° C. and charging 8.1 percent by weight of water, 76.5 percent by weight of ethyl acetate (2.0 percent by weight of ethanol as an impurity in the ethyl acetate) and 13.4 percent by weight of acetaldehyde, an ultimate efficiency of reaction of 58 percent was obtained which showed an efficiency of forty-five percent conversion of the acetaldehyde.

When ethyl acetate constitutes the sole charge with the acetaldehyde the percentage by weight of water in the charge may be varied quite widely, that is between zero and 25%. However, tests have shown that about twenty-five percent by weight of water is the maximum desirable weight of water for economical operations. When considering the process from all standpoints, however, it does not appear that any advantage is gained in using more than eight percent of water when making ethyl acetate the main charging stock.

The present process of using ethyl acetate as all of the charge, or as a part of the charge with ethanol, is applicable when aldehydes containing up to four carbon atoms, such as crotonaldehyde and butyraldehyde, are substituted for acetaldehyde in the feed. The crotonaldehyde operates equally efficiently as acetaldehyde. Butyraldehyde on the other hand will provide a good butadiene product, but its presence makes the operation of the process more difficult.

The preferred form of the invention having been thus described what is claimed as new is:

1. A process of making butadiene comprising: reacting a mixture consisting essentially of acetaldehyde with ethyl acetate in the vapor state in the presence of steam and a dehydrogenation-dehydration catalyst and recovering butadiene from the reaction products.

2. A process of making butadiene comprising: reacting ethyl acetate with acetaldehyde in the vapor state and in the molar ratio of two and a half mols to three mols of ethyl acetate for one mol of acetaldehyde in the presence of water and a dehydrogenation-dehydration catalyst and separating butadiene from the reaction products.

3. A process of making dienes comprising: reacting a mixture consisting essentially of an aliphatic aldehyde containing from two to four carbon atoms in the molecule and an acetic ester in the presence of a dehydrogenation-dehydration catalyst and recovering diolefine from the reaction products.

4. A process of making dienes comprising: reacting a mixture consisting essentially of an aliphatic aldehyde containing from three to four carbon atoms in the molecule and ethyl acetate in the presence of water and a catalyst of the group consisting of the oxides and silicates of tantalum, zirconium and columbium and recovering diolefine from the reaction products.

5. A process of making butadiene comprising: reacting a mixture consisting essentially of ethyl acetate with acetaldehyde in the vapor phase at a temperature of 300° to 400° C. in the presence of water and a catalyst comprising silica gel promoted with tantalum oxide and recovering butadine from the reaction products.

6. A process of making butadiene comprising: reacting ethanol and ethyl acetate with acetaldehyde in the vapor phase in a converter in contact with a dehydrogenation-dehydration catalyst in which the ethylacetate constitutes 5% to 7% by weight of the charge to produce butadiene and ethyl acetate, separating the butadiene and ethyl acetate from the reaction products and returning the ethyl acetate to the converted with the ethanol and acetaldehyde.

7. The process defined in claim 6 in which the reaction is established to produce ethyl acetate of approximately seven percent by weight of the combined feed to the converter.

8. The process of making butadiene defined in claim 1 in which the steam constitutes from 7 to 8 percent by weight of the combined weight of acetaldehyde and ethyl acetate being reacted.

9. A process of making butadiene comprising: reacting ethanol, ethyl acetate and acetaldehyde in the vapor phase in a converter in contact with a dehydrogenating-dehydrating catalyst in which the combined ethanol content, together with the ethyl acetate content to the acetaldehyde content are in the ratio of two and one-half to three mols of the mixture to one mol of the acetaldehyde, and wherein the ethyl acetate constitutes from 5 to 7% by weight of the charge to produce butadiene and ethyl acetate from the reaction, separating butadiene and ethyl acetate from the reaction products, and returning the ethyl acetate to the converter for further reaction.

ELDON E. STAHLY.

REFERENCES CITED

The following references are of record in the file of this patent:

UNITED STATES PATENTS

| Number | Name | Date |
|---|---|---|
| 1,098,859 | Webel | June 2, 1941 |
| 2,297,424 | Maximoff | Sept. 29, 1942 |
| 2,393,381 | Kinsey et al. | Jan. 22, 1946 |
| 2,403,741 | Murray et al. | July 9, 1946 |

OTHER REFERENCES

Walker et al., "Principles of Chemical Engineering," 3rd edition, 1937 (pages 527–529), McGraw-Hill.

Ostromislenskii article in Jour. Russian Phys. Chem. Soc., vol. 47 (1915), pages 1472–1494; translation photostat, pages 1–17 available in Div. 31 (pages 7, 14, and 16 pertinent).

Ostromislenskii et al. article in Jour. Soc. Chem. Ind., vol. 35, No. 1; (1916) page 17.